UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF MELTING AND CASTING SILICON.

No. 830,738.　　　　Specification of Letters Patent.　　　　Patented Sept. 11, 1906.

Application filed April 21, 1905. Serial No. 256,817.

*To all whom it may concern:*

Be it known that I, HENRY NOEL POTTER, a citizen of the United States, and a resident of New Rochelle, county of Westchester, State of New York, have invented certain new and useful Improvements in Methods of Casting Silicon, of which the following is a specification.

I have discovered that silicon possesses a novel property which is of value in the arts and which makes it possible to cast silicon in contact with carbon as container. In other words, the carbon-furnace can be employed for fusing silicon, provided the temperature is kept too low to form silicon carbid, after which the molten silicon can be poured into suitable molds.

The property referred to is that of the complete inertness of molten silicon near to the melting temperature (about 1,400°) centigrade with respect to carbon. The latter is not dissolved by the silicon nor reacted upon thereby to form a silicon carbid.

The present invention consists in melting silicon in contact with carbon and afterward pouring it into molds for securing any desired shape for silicon free from contained carbon or silicon carbid. In this way silicon can be cast for electric heating resistances or for making ingots of definite shape. Under the conditions named the silicon can be poured into molds of carbon or molds lubricated with graphite, which can afterward be brushed from the completed casting.

I claim as my invention—

1. The method of melting and casting silicon free from contained carbon or silicon carbid, which consists in fusing the silicon in contact with carbon as a container, keeping the temperature too low to form silicon carbid and pouring the molten silicon into suitable molds.

2. The method of melting and casting silicon free from contained carbon or silicon carbid, which consists in fusing the silicon in contact with carbon as a container, keeping the temperature too low to form silicon carbid and cooling the molten silicon in a suitable mold.

Signed at New York, in the county of New York and State of New York, this 20th day of April, A. D. 1905.

HENRY NOEL POTTER.

Witnesses:
　WM. H. CAPEL,
　GEORGE H. STOCKBRIDGE.